(12) United States Patent
Jammet (10) Patent No.: US 10,019,609 B2
(45) Date of Patent: Jul. 10, 2018

(54) CONTAINER FOR A COSMETIC PRODUCT HAVING A GIVEN PERIOD AFTER OPENING AND CARTRIDGE FOR SUCH A CONTAINER

(71) Applicant: ALBEA SERVICES, Gennevilliers (FR)

(72) Inventor: Jean-Claude Jammet, Amiens (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 15/648,393

(22) Filed: Jul. 12, 2017

(65) Prior Publication Data

US 2018/0018482 A1 Jan. 18, 2018

(51) Int. Cl.
*G06K 7/10* (2006.01)
*A45D 40/00* (2006.01)
*A45D 34/00* (2006.01)
*B65D 79/02* (2006.01)

(52) U.S. Cl.
CPC ......... *G06K 7/10316* (2013.01); *A45D 34/00* (2013.01); *A45D 40/00* (2013.01); *A45D 40/0068* (2013.01); *B65D 79/02* (2013.01); *G06K 7/10366* (2013.01); *A45D 2040/0006* (2013.01); *A45D 2200/051* (2013.01)

(58) Field of Classification Search
CPC ................. G06K 7/10316; G06K 7/10366
USPC ......................................................... 235/451
See application file for complete search history.

(56) References Cited

U.S. PATENT DOCUMENTS

| | | | |
|---|---|---|---|
| 9,495,851 B1* | 11/2016 | Russell | G06Q 10/00 |
| 2006/0256664 A1* | 11/2006 | Varon | |
| 2010/0106521 A1* | 4/2010 | Ashrafzadeh | G06F 19/3462 705/3 |
| 2010/0109852 A1* | 5/2010 | Bauchot | G06Q 10/06 340/10.51 |
| 2011/0121023 A1* | 5/2011 | Milan | |
| 2013/0304255 A1* | 11/2013 | Ratnakar | G07F 9/02 700/242 |
| 2016/0042214 A1* | 2/2016 | Barack | H04B 5/0056 340/10.4 |
| 2016/0058156 A1* | 3/2016 | Chiasson | |

FOREIGN PATENT DOCUMENTS

| FR | 2962307 | * | 1/2012 |
|---|---|---|---|
| WO | WO03087955 | * | 10/2003 |

* cited by examiner

*Primary Examiner* — Toan Ly
(74) *Attorney, Agent, or Firm* — Steven M. Greenberg, Esq.; CRGO Law

(57) ABSTRACT

A container for a cosmetic product having a given period after opening (PAO) is disclosed. The container includes at least one electronic data processing device able to read data which, associated with the product, is contained in a data medium to selectively record at least a first opening of the product so as to be able to calculate the period after opening (PAO) of the product and also relates to a cosmetic product cartridge for such a container.

13 Claims, 3 Drawing Sheets

CONTAINER FOR A COSMETIC PRODUCT HAVING A GIVEN PERIOD AFTER OPENING AND CARTRIDGE FOR SUCH A CONTAINER

CROSS REFERENCE TO RELATED APPLICATIONS

This application claims priority under 35 U.S.C. § 119(a) to French Patent Application Serial Number 1656686, filed Jul. 12, 2016, the entire teachings of which are incorporated herein by reference.

BACKGROUND OF THE INVENTION

Field of the Invention

The present invention relates to the field of cosmetic products, such as creams, lotions, balms, etc. intended to be packaged in different types of containers such as jars, bottles, tubes, etc., and more particularly, to a container for a cosmetic product having a given period after opening and a cartridge for such a container.

Description of the Related Art

In the field of cosmetic products, governmental regulations further require that the cosmetic product container include specific information regarding its durability for use, in order to improve the information given to consumers.

The date of minimum durability is for example indicated by the words "best if used by DD/MM/YY or MM/YY" on certain products.

The "date of minimum durability" refers to the date until which the cosmetic product, stored under appropriate conditions, the packaging or the container in particular never having been opened, continues to perform its initial function, retains its properties and remains safe for human health. This is also referred to as "Best-Before Date" (BBD).

However, the indication of the date of durability is required only when the durability of the cosmetic product does not exceed 30 months.

When the durability of the cosmetic product exceeds 30 months, the products generally bear another indication corresponding to the duration during which the product is safe after opening and can be used without harm to the consumer.

This duration indication is commonly called "Period After Opening" (PAO).

The PAO period is thus indicated by a regulated symbol depicting an open jar, with a usage duration expressed in months and/or years.

The period after opening is determined using various criteria, in particular relative to the risk of microbial contamination.

If the mention of the period after opening appears on the container containing the cosmetic product according to the regulation, the "PAO" indicates a period, for example 6 or 12 months, and not a specific date, in particular in comparison with the aforementioned date of durability.

When one wishes to know whether a cosmetic product is safe, i.e., whether it has exceeded the corresponding limit of its period after opening, it is then first and foremost necessary to note the date on which the product was first opened, which is the only date from which it is possible to calculate whether one is still within the period after opening.

Yet it is very rare for the information to be noted, in any manner, consisting of the first opening date of a cosmetic product container, and consequently for that date to be remembered.

That is why one is generally completely unable to subsequently determine whether the product is expired or whether one is still within the period after opening of the product.

BRIEF SUMMARY OF THE INVENTION

The aim of the invention is particularly to resolve this problem by proposing a solution to be able to check the period after opening of a cosmetic product easily.

To that end, the invention proposes a container for a cosmetic product having a given period after opening, the container including at least one electronic data processing device able to read one or several data which, associated with the product, are contained in a data medium to selectively record at least a first opening of the product so as to be able to calculate the period after opening of the product.

Advantageously, the first opening of the product is selectively detected by the electronic data processing device, in particular detected automatically using protection means that must be removed to be able to use the cosmetic product packaged in the container.

According to the invention, the date of first opening of the product is then recorded by the electronic data processing device, owing to which the period after opening (PAO) is subsequently able to be calculated.

Advantageously, the electronic device is connected to indicator means and/or an apparatus in particular to be able to issue an alert if the period after opening has expired.

Advantageously, the apparatus is a wireless telephone that includes an application and that is able to exchange data with the electronic device contained in the container, the device providing it with at least one piece of information related to the period after opening (PAO).

Preferably, the electronic device communicates, to the apparatus, data associated with the product and read in the data medium as well as the date of first opening and/or the remaining duration before the expiration of the period after opening (PAO).

Advantageously, the device also communicates the charge level of the battery making up the power supply means of the device.

The application installed in the apparatus then watches to ensure that the level is always sufficient to guarantee proper operation of the electronic device integrated into the container and issues an alert when the battery (cell) must be changed.

The application makes it possible to give the user not only information on the cosmetic product of the connected container, in particular the period after opening (PAO), but also other information such as targeted advice, commercial offers, product authentication, etc.

The connected container, advantageously associated with an application installed on a telephone, is an innovative concept making it possible to establish a customized communication between a brand and its customer base, cosmetic product users.

Preferably, the cosmetic product container according to the invention is not intended for a single use.

Indeed, the container is advantageously able to be refilled with cosmetic product using a cartridge containing cosmetic product. A cartridge change in the container is for example done when the cosmetic product has been completely used or when the period after opening (PAO) of the cosmetic product has expired.

According to other features of the invention:
the data medium is an RFID tag able to be read by radiofrequency by the electronic device;
removable protection means are arranged to form a screen prohibiting reading of the data medium by an antenna of the electronic device until the protection means are eliminated the first time the product is opened;
the protection means are made up of part of a membrane seal that is sealed to cover the product contained in the container;
the container includes a cavity able to receive a cosmetic product cartridge to refill the container with product;
the container includes a cavity in which a cosmetic product cartridge is mounted to refill the container with product;
the data medium is secured to the cosmetic product cartridge;
the container and the cartridge include angular indexing means to position the data medium relative to the antenna of the electronic data processing device;
the electronic data processing device is able to be supplied with electric current by power supply means formed by at least one battery, such as a button battery;
the electronic data processing device is able to occupy an active state and a passive state in which the device is stopped or in standby mode, in particular to reduce the electricity consumption thereof;
the electronic data processing device is able to exchange data with at least one electronic apparatus, the apparatus including a software application intended to deliver items of information via at least one display screen, including at least one related to the period after opening.

The invention also proposes a cosmetic product cartridge having a given period after opening (PAO) for refilling a container of the type including at least one electronic data processing device able to read one or several data which, associated with the cosmetic product, are contained in a data medium to selectively record at least a first opening of the product so as to be able to calculate the period after opening (PAO) of the product, characterized in that the cartridge includes the data medium.

Advantageously, the data medium secured to the cartridge is an RFID tag.

According to other features of the cartridge:
the cartridge includes removable protection means are arranged to form a screen prohibiting reading of the data medium until the protection means are eliminated the first time the product is opened;
the protection means are made up of part of a membrane seal that is sealed to cover the product contained in the cartridge;
the cartridge includes angular indexing means intended to cooperate with complementary means of the container to position the data medium relative to the electronic data processing device, in particular relative to an antenna of the electronic data processing device.

BRIEF DESCRIPTION OF THE SEVERAL VIEWS OF THE DRAWINGS

Other features and advantages of the invention will appear upon reading the following detailed description, for the understanding of which reference will be made to the appended drawings, in which.

DETAILED DESCRIPTION OF THE FIGURES

In the rest of the description, we will non-limitingly adopt the longitudinal, vertical and transverse orientations in reference to the trihedron (L, V, T) shown in the figures.

Conventionally, the longitudinal and transverse orientations are determined in a fixed manner relative to the body of the container, such that the open or closed position of the cover of the container also has no impact on the longitudinal and transverse orientations.

We will also non-limitingly use the terms "upper" and "lower" in reference to the vertical orientation of the trihedron (L, V, T) as well as the radial direction, which is orthogonal to the vertical direction. The terms "inner or interior" and "outer or exterior" are respectively used relative to the container in general, and more particularly relative to the body of the container to designate an element situated either inside or outside.

FIGS. 1 to 5 show one example embodiment of a container 10 according to the invention provided as a non-limiting example.

The container 10 is intended to contain a product having a given period after opening (PAO), in particular a cosmetic product.

A cosmetic product is only one preferred example of a product having a given period after opening (PAO). As previously indicated, the period after opening (PAO) of the product is generally indicated in number of months, sometimes years, and begins from the first opening of the product.

In the example shown in FIGS. 1 to 5, the container 10 consists of a jar intended to package a cosmetic product, in particular a cream.

In an alternative that is not shown, the container 10 is for example made up of a vial, a tube, an applicator, in particular a "lipstick", a dispenser with a pump, etc.

The type of container is in particular determined as a function of the cosmetic products, for example a cream, lotion, gel, lip balm stick or lipstick, etc.

As illustrated in FIGS. 1 to 5, the jar 10 globally outwardly has a parallelepiped shape, here a cube. Alternatively, the jar is cylindrical or has any other geometric shape.

Figure 2:
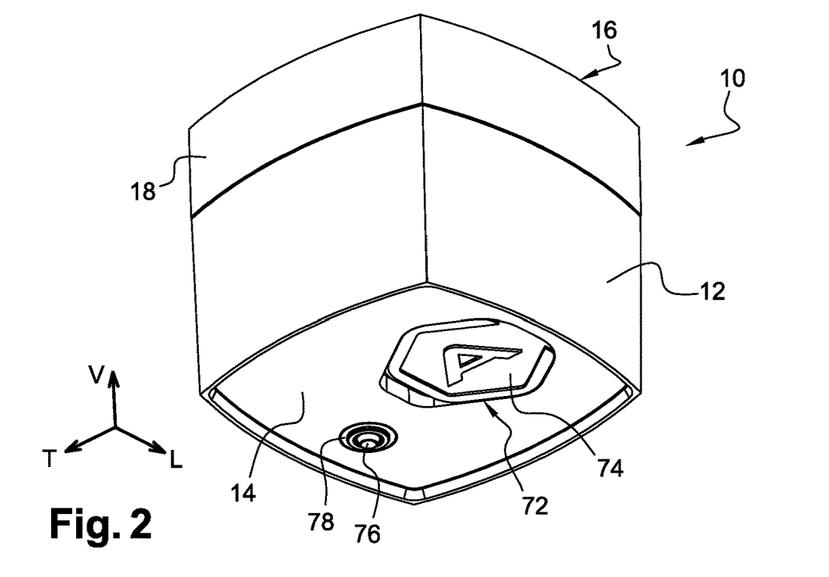
FIG. 2 is a perspective view showing a jar according to FIG. 1 with its cover in the closed position and showing the bottom of the jar including an access hatch to change the battery powering the electronic device as well as a button controlling at least the turning on of the electronic device making it possible to calculate the period after opening (PAO) of the cosmetic product.

The jar 10 includes at least one body 12, the lower part of which is closed by a bottom 14 as illustrated in FIG. 2 and which, at the opposite end, can be opened or closed based on the position of a cover 16.

Figure 3:
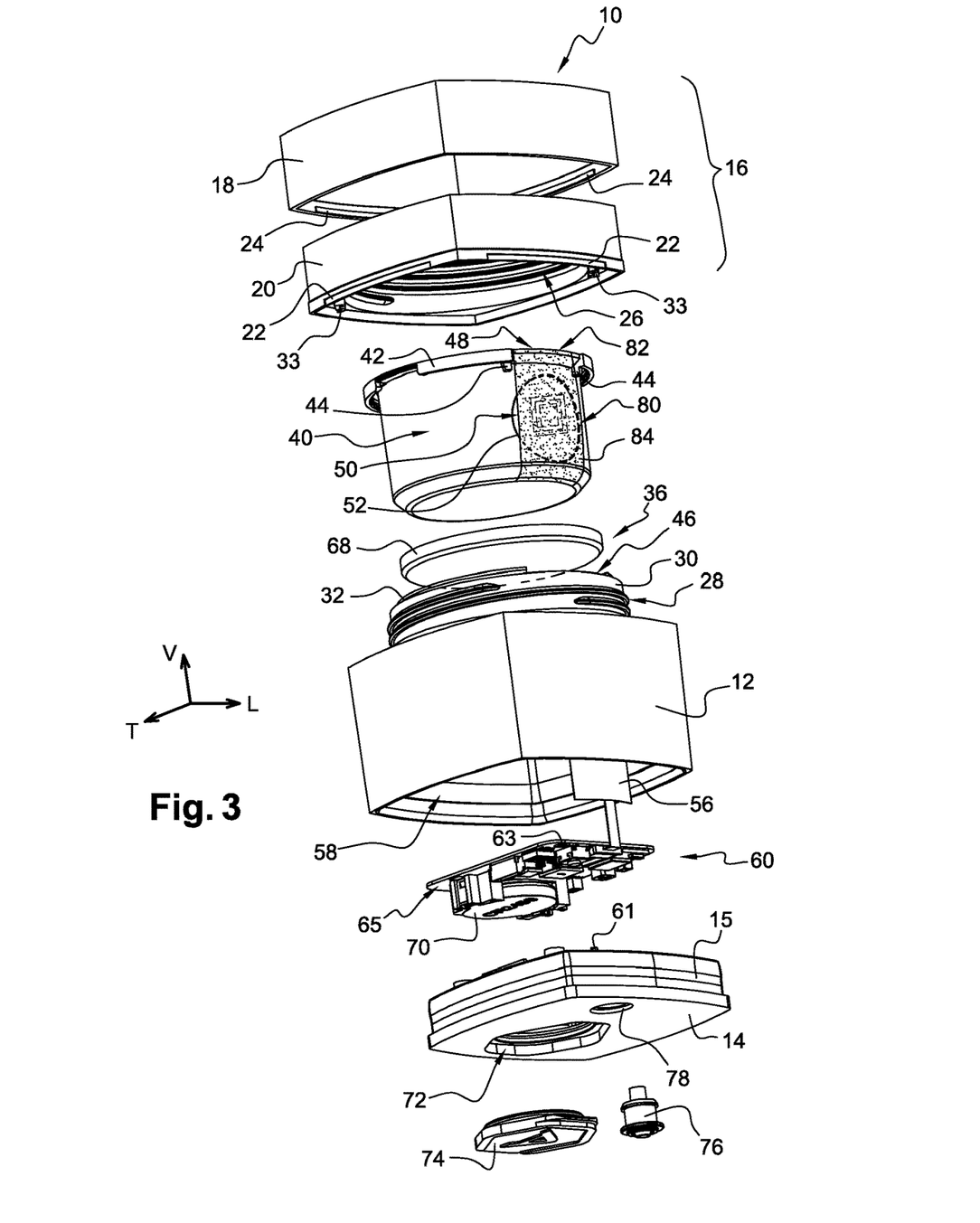
FIG. 3 is an exploded perspective view of the main elements of the jar according to the example embodiment of FIGS. 1 and 2 and illustrating the electronic device provided with an antenna, a data medium secured to a cosmetic product refill and protection means forming a screen in front of the data medium.

As illustrated in FIG. 3, the bottom 14 of the jar 10 is a separate part that can be nested in the body 12.

The bottom 14 includes a skirt 15 that extends vertically upward and radially outwardly has a convex face intended to cooperate with part of the inner face of the body 12 of the jar 10 situated across from it when the bottom 14 is nested.

Figure 1:
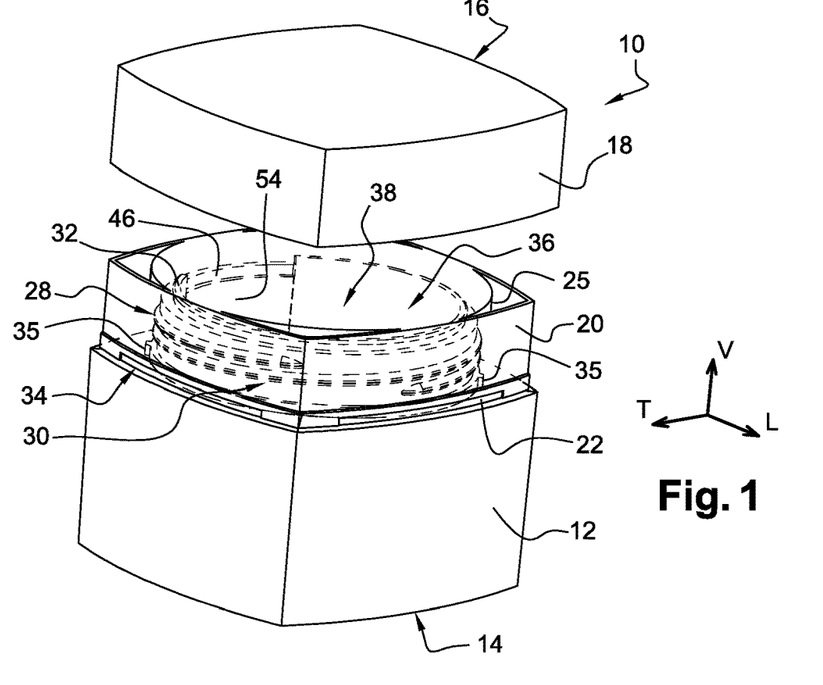
FIG. 1 is a perspective view showing an example container according to the invention formed by a jar incorporating an electronic data processing device and which illustrates the jar with a cover in the open position and without refilling cosmetic product inside the jar.

In FIG. 1, the cover 16 being removed, the jar 10 is open to allow access to the packaged product, while in FIG. 2, the jar 10 is inversely closed via the cover 16.

Preferably, the cover 16 is an independent piece from the body 12 of the jar 10 in the open position. Alternatively, the cover 16 is connected to the body 12 for example by a hinge providing a pivoting mounting of the cover 16 between at least an open position and a closed position of the jar 10.

Preferably, the cover 16 is made in two parts, respectively an outer lid 18 and a sub-lid 20 intended to be mounted inside the lid 18.

In the example embodiment, the sub-lid 20 is nested inside the lid 18 so as to obtain the cover 16 of the jar 10.

Advantageously, connecting means are provided between the two parts of the cover 16 to immobilize the sub-lid 20 relative to the lid 18. The connecting means are for example made by shape cooperation.

As illustrated by FIG. 3, the sub-lid 20 includes notches 22 distributed over its four side faces in which slots 24 are engaged in a complementary manner that are arranged inside the rim of the lid 18.

In FIG. 1, the sub-lid 20 is not shown assembled with the lid 18 to form the cover 16, such that the notches 22 are also visible there.

The cover 16 includes sealing means 25 to provide sealed closing of the jar 10 so as to protect the cosmetic product contained inside.

After assembly of the lid 18 and the sub-lid 20, the outside of the obtained cover 16 advantageously has a homogenous shape with respect to that of the body 12, favoring the general esthetics of the jar 10 in the closed position.

The sub-lid 20 inwardly includes a circular thread 26 that is complementary to a thread 28 of the neck 30 of the jar 10 to allow a connection by screwing between the cover 16 and the neck 30.

The neck 30 radially includes the thread 28 on its outer surface, while the sub-lid 20 radially includes the thread 26 complementary to the thread 28 on its inner face, the threads 26 and 28 in particular being visible in FIG. 3.

The sealing means 25 of the cover 16 are made in the form of a disc housed inside the cover 16, between the inner face of the lid 18 and the sub-lid 20.

In the closed position, the sealing means 25 are compressed against an edge 32 of the neck 30 to ensure sealed closing of the jar 10.

Preferably, the jar 10 includes abutment means 34 that determine the final position of the cover 16 when the jar 10 is in the closed position.

The abutment means 34 are for example respectively formed by two elastic arms 33 secured to the sub-lid 20 and two lugs 35 secured to the neck 30, the two arms 33 being arranged diametrically opposite one another, as are the two lugs 35 as well.

In FIG. 1, the sub-lid 20 and the sealing disc 25 have respectively been shown transparently so as in particular to make the neck 30 visible.

The edge 32 of the neck 30 defines a circular opening 36 emerging in an inner cavity 38 that is arranged in an upper part of the body 12 of the jar 10, the cavity 38 being intended to receive the cosmetic product, directly or indirectly.

Preferably, the cosmetic product is packaged in a cartridge 40 intended, in the usage position, to be received in the cavity 38 of the container 10.

Advantageously, the product cartridges 40 make it possible not to limit the jar 10 to a single use.

Owing to the cartridges 40, the jar 10 is able to be used more than once by successively being refilled with a new cartridge 40 when the cartridge 40 in place must be replaced, in particular if all of the product has been used or the period after use (PAO) has expired.

In an alternative that is not shown, the cosmetic product is directly introduced into the cavity 38 formed in the body 12, without being packaged in a cartridge.

The cartridge 40 is configured to be mounted in the cavity 38 of the jar 10.

The cartridge 40 includes, at its upper end, a rim 42 having, in sectional view, a hollow profile in the shape of an upside down "U" and in which the edge 32 of the neck 30 penetrates when the cartridge 40 is mounted in the cavity 38 of the jar.

The cartridge 40 is intended to be mounted in a determined angular position relative to the cavity 38 owing to angular indexing means.

In the example embodiment, the cartridge 40 includes at least one indexing pin 44, preferably a pair of pins 44.

The indexing pins 44 are intended to be housed in a complementary notch 46 that is arranged inside the neck 30 of the jar 10 defining the opening 36.

Owing to the angular indexing means, the cartridge 40 may only be mounted in the cavity 38 of the jar 10 in a position in which the indexing pins 44 are across from the notch 46 of the neck 30.

The rim 42 of the cartridge 40 is circumferentially interrupted at least between the indexing pins 44 so as to define, with the notch 46 of the edge 32 of the neck 30, a passage slit 48, the function of which will be described later.

The jar 10 includes a data medium 50 in particular including information associated with the cosmetic product.

Preferably, the data medium 50 is an RFID tag, also called "transponder", and generally includes a chip associated with an antenna.

Advantageously, the RFID tag forming the data medium 50 is a passive tag, i.e., as opposed to an active tag, a tag not including an internal power source.

"RFID" is the acronym for "Radio Frequency IDentification" and corresponds to a technology in which at least one reading of data contained in the RFID tag is done, without contact, by radiofrequency using a "RFID interrogator" device, also sometimes called "RFID reader".

The RFID interrogator device is able to emit radio frequencies that will activate at least one RFID tag by providing it with the energy necessary for its operation, inasmuch as the RFID tag is located at an appropriate detection distance that will in particular vary as a function of the frequencies used, from the low frequencies (LF) to the high frequencies (HF), or sometimes even higher still.

The RFID interrogator sends specific commands to which the tag responds, one of the simplest responses generally being to return an identification datum.

Of course, the RFID technology and the type of data medium 50 are provided merely as non-limiting examples.

Alternatively, other equivalent contactless data exchange technologies can be considered, for example be optical viewing or infrared connection, in particular with linear bar codes or 2D codes or the QR code type.

The RFID technology is preferred here in the application of the invention to a container for a cosmetic product due to its ease of implementation, reliability and cost.

Advantageously, the RFID querying of the data medium 50 is more specifically done in NFC (Near Field Communication), with which the data exchanges are done at very short distances, in the vicinity of several centimeters.

In the example embodiment, the data medium 50 is secured to the cartridge 40. The cartridge 40 includes a recess 52 in its outer surface in which the data medium 50 is intended to be placed. The data medium 50 is for example fastened on the cartridge 40 by gluing.

Owing to the recess 52, the data medium 50 is fully integrated into the cartridge 40. Indeed, the medium 50 does not protrude relative to the outer surface of the cartridge 40, in particular when the data medium 50 is an RFID tag.

The cavity 38 is radially defined by an inner wall that includes a recess 54 intended to allow the installation of the antenna 56 (not shown in FIG. 1).

The antenna 56 is intended to allow at least the reading of one or several data media 50 by radiofrequency.

The lower part of the jar 10 includes a housing 58 in which an electronic data processing device 60 is arranged. The antenna 56 is connected to the electronic data processing device 60.

The antenna 56 is only one non-limiting example of means of a device 60 for performing at least one data exchange, in particular reading of the data medium 50 by radiofrequency.

Alternatively, the electronic data processing device 60 includes means of the optical reader or transceiver type, in particular when other contactless data exchange technologies, for example optical vision or infrared connection, are used.

Owing to the angular indexing means 44, 46 previously described, positioning of the data medium 50 borne by the cartridge 40 is provided, here relative to the antenna 56 of the electronic data processing device 60.

The notch 46 made in the neck 30 and which cooperates with the pins 44 to form the angular indexing means of the cartridge 40 is situated vertically above, overhanging, the recess 54 intended for installation of the antenna 56.

The indexing means 44, 46 make it possible to position the data medium 50 across from the antenna 56, the medium 50 and the antenna 56 then being separated from one another by a very short distance of around a centimeter.

Advantageously, the container 10 includes angular indexing means 46 intended to cooperate with the complementary angular indexing means 44 to position the data medium 50 relative to the electronic data processing device 60, here relative to the antenna 56.

Without the antenna 56, the indexing means 44, 46 make it possible to position the data medium 50 relative to the electronic data processing device 60, for example relative to means of the optical reader or transceiver type.

In the example embodiment, the jar 10 includes at least one wall 62 that extends horizontally, forming a separation between the cavity 38 situated above and the housing 58 of the electronic data processing device 60 situated below.

The electronic data processing device 60 is primarily made up of a board 65 of the printed circuit type to connect the various electronic components there.

Preferably, the board 65 is mounted secured to the bottom 14, for example immobilized via blocking means.

In the example embodiment, the blocking means of the board 65 are formed by two pilot points 61, which, forming the free end of a column secured to the bottom 14, are each inserted in a complementary hole 63 arranged in the board 65.

The jar 10 advantageously includes means for fastening the bottom 14 with the body 12.

Figure 4:
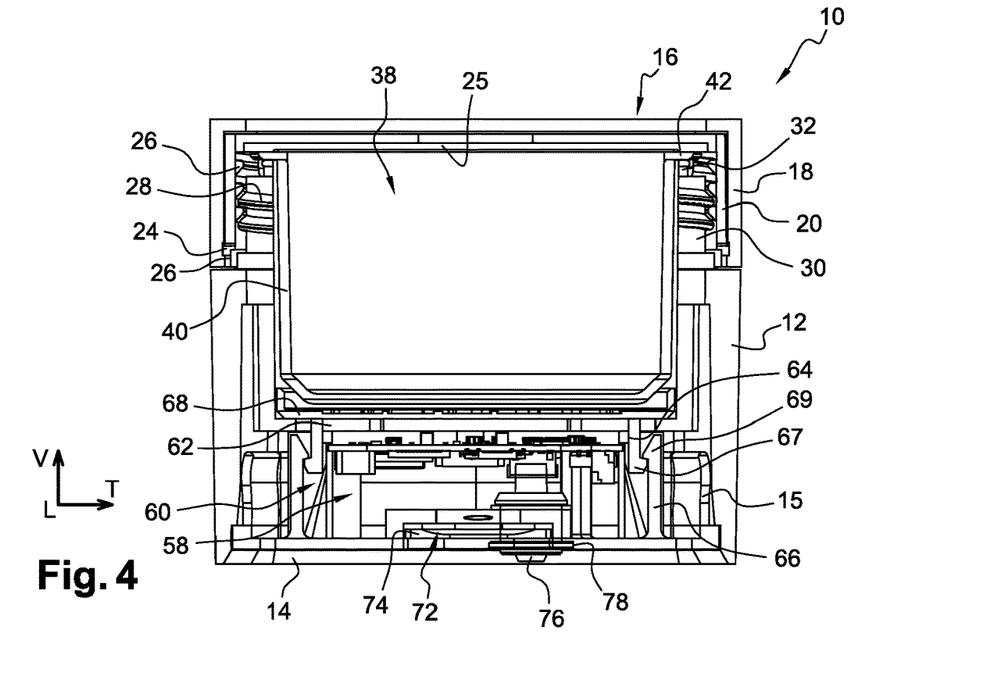
FIGS. 4 and 5 are sectional views which, along a median plane respectively offset by 90° from one figure to the other, show a jar according to FIG. 3 in the closed position and which also show the arrangement of the main elements in the jar including an inner cavity that receives a cosmetic product refill provided with a data medium and, below the cavity, a housing for mounting the electronic data processing device.
Figure 5:
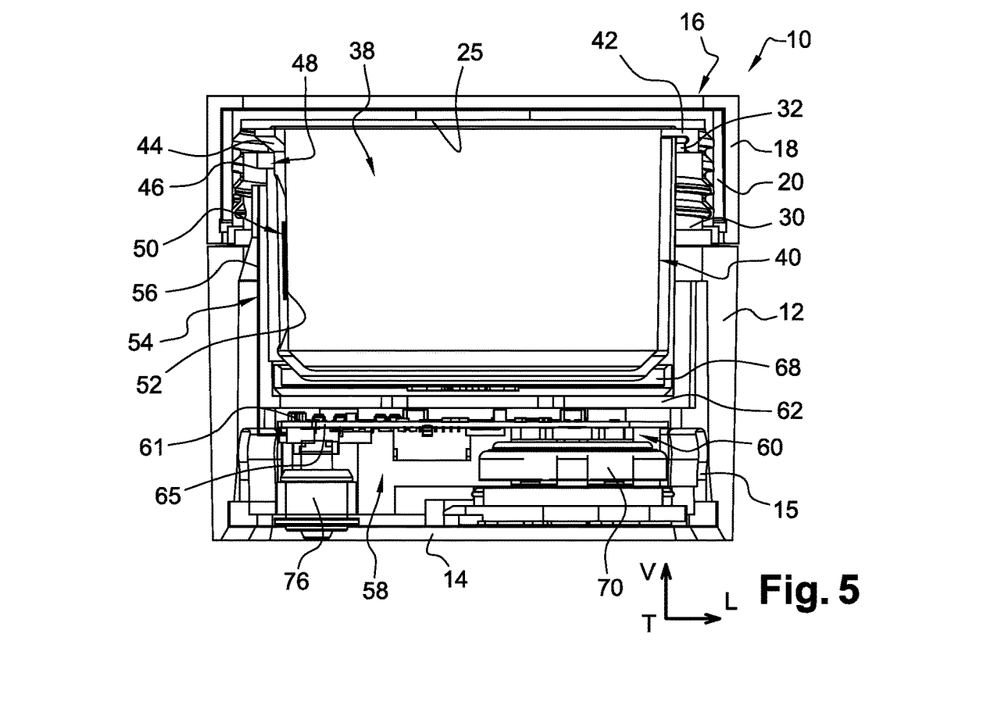

In the example embodiment, the body 12 for example includes two fastening tabs 64, which, visible in the sectional view of FIG. 4, extend vertically downward in the housing 58 and are intended to cooperate with two other fastening tabs 66.

The fastening tabs 66 are secured to the bottom 14 supporting the electronic data processing device 60 and extend vertically upward from the bottom.

The free end 67 of each of the fastening tabs 64 and that 69 of each of the fastening tabs 66 are respectively configured to mutually engage with one another in order to see to the retention of the bottom 14.

The free ends 67 and 69 in fact form hooks that engage when the bottom 14 is vertically nested from the bottom toward the top inside the body 12.

Preferably, the two fastening tabs 64 are made integrally, in a single piece, with the separating wall 62.

As illustrated by FIG. 4, the separating wall 62 is then open-worked at the base of the fastening tabs 64 such that the partition 62 does not sealably separate the cavity 38 receiving the cosmetic product cartridge 40 on the one hand and the housing 58 in which the electronic data processing device 60 is arranged on the other hand.

Preferably, a sealing partition 68 is positioned at the bottom of the cavity 38 to sealably isolate the housing 58. The electronic data processing device 60 is thus protected, in particular from any contact with the cosmic product in case of flow from the cavity 38 receiving the cartridge 40.

The sealing partition 68 advantageously completes the protection of the electronic data processing device 60 already obtained with the cooperation between the convex surface of the skirt 15 of the bottom 14 and the body 12 to isolate the housing 58 relative to the outside.

The electronic data processing device 60 is able to be supplied with electric current by power supply means 70.

Advantageously, the power supply means 70 of the electronic device 60 include at least one battery.

Preferably, the at least one battery forming the power supply means 70 is integrated into the housing 58 with the electronic data processing device 60 so as to allow the container, here the jar 10, to retain its nomadic nature.

In the example embodiment as illustrated in FIG. 3, the power supply means 70 are formed by at least one battery cell. The battery cell 70 is preferably a button battery which, having a flat shape, is compact.

Such button batteries (for example CR2450, etc.) are commonly used to power electronic devices and therefore have the advantage of being readily commercially available and, what is more, inexpensive.

The bottom 14 includes a hatch 72 allowing direct access to the battery cell 70 secured to the board 65 of the device 60 situated inside the housing 58 of the jar 10.

Advantageously, the hatch 72 makes it possible to change the battery cell 70 when necessary to guarantee the power supply of the device 60. Such a change is for example done once per year, preferably about every two years.

The access hatch 72 includes an opening able to be closed by a retractable shutter 74, the shutter 74 advantageously including a sealing gasket (not shown).

Many alternatives of the power supply means 70 are possible to supply electrical current to the electronic data processing device 60.

The choice of the power supply means 70 is in particular made based on design parameters such as the desired autonomy, the power consumption of the electronic data processing device 60, etc.

Alternatively, the electronic data processing device 60 is powered without contact to recharge an internal battery by induction, for example using the Qi technology.

Compared to the power supply means 70 made up of a button battery, such a battery remains on board, integrated inside the jar 10, but does not require an intervention to be changed.

The hatch 72 arranged in the bottom 14 according to the example embodiment described above may for example be eliminated.

Alternatively, the power supply means 70 include a photovoltaic cell powered using solar energy to supply electricity to the device 60, as primary or secondary power source.

Of course, the power supply means 70 of the device 60 can also be made more conventionally to recharge a battery, not without contact, but with a wired connection for example through a power cord able to be connected to a power jack via a transformer.

According to another alternative, a cable with a USB or equivalent jack is used to recharge an internal battery of the electronic device 60.

Advantageously, such a USB cable can also make it possible to exchange data between the electronic data processing device 60 and at least one apparatus, such as a computer, tablet or telephone.

Advantageously, the electronic device 60 according to the example embodiment is able to occupy an active state and a passive state so as not to work continuously, in particular to reduce the power consumption and increase the autonomy.

The electronic data processing device 60 is able to occupy an active state, in which the device 60 will at least read data from the medium 50, and a passive state, in which the device is stopped or in standby mode.

The jar 10 includes at least one control member 76 able to control at least the powering on of the device 60, i.e., a change from the stopped state to the active state.

As illustrated in FIG. 2, the jar 10 includes, in the bottom 14, a piercing 78 to allow the through mounting of such a control member 76.

The control member 76 is for example a switch or button. The control member 76 includes one end connected to the board 65 of the electronic device 60 situated inside the housing 58 and another end protruding outside so as to be able to be actuated manually.

Preferably, the electronic data processing device 60 is selectively controlled via an internal clock between the active and passive states in which the device 60 is placed in standby mode.

The electronic data processing device 60 is therefore not stopped after it is turned on, but preferably kept in standby mode.

The device 60 is for example commanded to change from the passive state to the active state at least once per day, so as to be able to detect a new data medium 50 with a daily search frequency.

Alternatively, the control member 76 is a switch of the On/Off type to selectively command the electronic device 60 between the active and passive states.

The electronic data processing device 60 is able to read one or several data contained in the data medium 50 via the antenna 56.

The data contained in the medium 50 are in particular associated with the cosmetic product. Non-limitingly, the data are for example items of information such as a product reference allowing identification, a manufacturing date, a duration corresponding to the period after opening (PAO), a unique serial number to allow verification of authenticity, etc.

The electronic data processing device 60 is in particular able to selectively record at least a first opening of the product so that it can subsequently check the period after opening (PAO) of the product.

The electronic device 60 for example records the date of the day corresponding to the first opening of the product.

The electronic device 60 next allows the automatic performance of a calculation of the period after opening (PAO) so as to check it and preferably issue an alert when the period after opening (PAO) has expired, is expiring or will expire.

The data medium 50 is automatically read by radiofrequency once the medium 50 is in the detection field of the antenna 56 of the electronic data processing device 60, as long as the latter is in the active state.

According to the example embodiment previously described, such reading of the data medium 50 occurs when a cartridge 40 including the data medium is inserted into the cavity 38 of the jar 10.

The device 60 will read the data contained in the data medium 50 and will thus identify, for the first time, the medium 50 supported by the cartridge 40; the device 60 then records at least the date corresponding to the first opening.

However and as previously indicated, a jar 10 able to be refilled with cosmetic product using cartridges 40 is only one non-limiting example embodiment.

When no cartridge 40 is present, it is necessary to have the assurance that the detection of a data medium 50 by the device 60 on a given date in fact corresponds to the date of first opening, so as to subsequently be able to calculate the period after opening (PAO) reliably.

Preferably, removable protection means 80 are inserted to form a screen between the data medium 50 and the antenna 56 of the electronic data processing device 60.

The protection means 80 forming a screen are intended to prevent reading of the data medium 50 before the protection means 80 are eliminated upon a first opening of the product.

In the example embodiment, the cartridge 40 advantageously includes a membrane seal 82 intended to protect the cosmetic product, in particular from any contact with air.

The membrane seal 82 is for example heat-sealed on the rim 42 of the cartridge 40 to store the cosmetic product contained in the cartridge 40 between manufacturing and the first opening for use.

Preferably, the membrane seal 82 is made from a metal material, for example aluminum.

Advantageously, the protection means 80 are designed to guarantee that their elimination is obtained simultaneously with the first opening of the product, i.e., is concomitant therewith.

Indeed and according to the example embodiment, the insertion of a cartridge 40 into the jar 10 is not necessarily accompanied by a first opening of the product, the membrane seal 82 certainly being able to be removed immediately, but also at a later time.

The date recorded by the device 60 may then be inaccurate, and consequently, the calculation of the period after opening (PAO) is distorted and erroneous.

It must be noted that a similar problem may occur in an embodiment with no cartridge 40, when the cosmetic product is packaged directly in the jar 10.

To resolve the problems of a shift between the date recorded by the device 60 and the actual date of first opening of the products, it is further possible to use the control member 76 to activate the device 60 selectively, in particular causing it to go from the stopped state to the active state, or by thus commanding a reset of the device 60.

However, there is then still a risk of a shift, for example if one forgets to activate the device 60 the first time the product is opened, or if the control member 76 is accidentally actuated before the first opening of the product.

According to one particularly advantageous feature, the protection means 80 forming a screen are made up of part of the membrane seal 82.

Advantageously, the membrane seal 82 is made from a metal material, such as aluminum, which is suitable to obtain a screen that is able to block the reading of the data medium 50 by the antenna 56 of the device 60.

The part of the membrane seal 82 forming the protection means 80 is for example made up of a strip 84 which, by a determined width, extends from the membrane seal 82 in order to completely cover the data medium 50 and form the screen.

Preferably, the strip 84 extends over a sufficient length to allow the free end thereof to be fastened beyond the data medium 50, on the cartridge 40, for example on the bottom of the cartridge 40.

The free end of the strip 84 is advantageously fastened to the cartridge 40, for example by gluing, in order to immobilize the protection means 80 so as to be able to act as a screen in front of the data medium 50.

Advantageously, the fastening of the strip 84 is done so as to immobilize it while nevertheless giving way easily when a pulling force is exerted on the strip 84.

Such protection means 80 will be eliminated simultaneously with the membrane seal 82 the first time the product is opened, more specifically here when the cartridge 40 is opened.

Advantageously, the membrane seal 82 includes gripping means (not shown), such as a tongue or lug, intended to make them easier to eliminate the first time the product is opened.

In the example embodiment, the protection means 80 are able to be eliminated even when the cartridge 40 is inside the cavity 38 of the jar 10, in the usage position.

A user wishing to open the product for the first time will remove the membrane seal 82 from the cartridge 40, if applicable with the help of gripping means offering her a free part that is not sealed and is easy to grasp.

When the user has finished removing the membrane seal 82, having completely separated it from the rim 42 of the cartridge 40, continuing the pulling force allows her to then simultaneously eliminate the protection means 80.

Indeed, the strip 84 forming the protection means 80 is advantageously free to be removed simultaneously with the membrane seal 82 owing to the passage slit 48 arranged between the rim 42 of the cartridge 40 and the edge 32 of the neck 30.

Consequently, producing protection means 80 in a single piece with the membrane seal 82 offers the guarantee that the date recorded by the device 60, henceforth free to read the data medium 50, indeed corresponds to the date of first opening of the product.

When no protection means 80 are present, the electronic device 60 reads the data medium 50 via the antenna 56, the data medium 50 then in particular giving it information making it possible to identify the cosmetic products.

Preferably, the information read by the device 60 includes the duration of the period after opening (PAO) of the product, for example 6 or 12 months.

Owing to the elimination of the protection means 80, the device 60 can record the date of first opening of the product, corresponding in the example to the removal day of the membrane seal 82 covering the cartridge 40.

The device 60 then has necessary data that may be transmitted and/or used directly to calculate a duration elapsed since the date of first opening in order to determine whether the period after opening (PAO) of the product has expired.

To that end, the device 60 for example compares the duration elapsed since the date of first opening and the date of the period after opening (PAO) of the product.

Advantageously, an alert is in particular given when, the duration elapsed being longer than the duration of the period after opening (PAO), the period after opening (PAO) of the product is expired, exceeded.

Alternatively, the protection means 80 are also able to be eliminated before inserting a cartridge 40 into the jar 10, and in particular but not exclusively when the protection means 80 forming a screen are independent of the membrane seal 82.

The protection means 80 are then advantageously provided with gripping means to facilitate their elimination, for example by pulling, like for the membrane seal 82.

The protection means 80 and the data medium 50 are not necessarily secured to the cosmetic product cartridge 40.

Alternatively, the protection means 80 are integrated directly into the structure of the jar 10, independently of whether the jar 10 is refillable using a cartridge 40.

Alternatively, the protection means 80 are able to be eliminated simultaneously with the first opening of the container, the protection means 80 for example being connected to the cover 16 so as to be removed automatically the first time the jar 10 is opened.

Preferably, the protection means 80 are then no longer secured to the data medium 50, whether the latter is housed in the jar 10 or secured, as above, to a refill 40.

If the metal materials used for the membrane seal 82 are appropriate for obtaining a screen, the protection means 80 may also be obtained with other materials, for example a plastic film including at least one conducting layer to form the screen.

Alternatively, the protection means 80 are secured to the data medium 50 and cover it to form a screen for the exchanges, reading and/or writing, by radiofrequency with the electronic device 60 of the jar 10.

Advantageously, the electronic data processing device 60 is able to exchange data with at least one electronic apparatus (not shown).

Preferably, the at least one electronic apparatus is in particular a mobile telephone, a tablet, a computer or any other similar device in particular including at least one display screen.

Preferably, the device 60 communicates with the apparatus using technology of the "BLE" (Bluetooth Low Energy) type.

Alternatively, the exchange of data between the device 60 and the apparatus is done using any other equivalent data exchange technology, preferably "contactless".

The electronic apparatus advantageously includes a software application that is intended to deliver information related to the cosmetic product, and particularly the period after opening (PAO).

Preferably, the electronic device 60 communicates, to the apparatus, data associated with the product and read in the data medium 50 as well as the date of first opening and/or the remaining duration before the expiration of the period after opening (PAO).

Advantageously, the device 60 also communicates the charge level of the battery making up the power supply means 70 of the device.

The application installed in the apparatus watches to ensure that the battery level is always sufficient to guarantee proper operation of the electronic device and is able to generate an alert when the battery must be changed.

The application installed on the apparatus makes it possible to give the user not only information on the cosmetic product of the connected container, in particular the period after opening (PAO), but also other information such as a product authentication, targeted advice, commercial offers, etc.

The application for example includes a calendar function or communicates with the calendar of another application installed on the apparatus.

In an alternative that is not shown, the container 10 includes indicator means (not shown) making it possible to monitor the period after opening (PAO) of the product, the indicator means for example being lighted display means and/or audible warning means.

The lighted display means are for example made up of a digital screen, in particular able to display the expiration date of the period after opening (PAO), alternatively by at least one bulb, in particular of the LED type, for example selectively emitting a red light when the period after opening (PAO) has expired. Of course, the invention is in no way limited to a container made up of a jar according to the example embodiment and could be applied to other example containers such as a tube, vial, etc., which may also be intended for a single use or rechargeable using product cartridges.

Alternatively, the electronic data processing device can be integrated into any part of the container, the device for example being secured to a stopper intended to close a tube, the tube then constituting a product cartridge so as to allow reuse of the stopper.

The invention claimed is:

1. A container for a cosmetic product having a given period after opening (PAO), said container including at least one electronic data processing device able to:
   read data associated with the product and contained in a data medium;
   and selectively record at least a first opening of the product so as to be able to calculate the PAO of the product; and,
   the device comprising removable protection arranged to form a screen prohibiting reading of the data medium by an antenna of the electronic device until said removable protection is eliminated once the product has been opened initially.

2. The container according to claim 1, wherein the data medium is an RFID tag able to be read by radiofrequency by said electronic device.

3. The container according to claim 1, wherein the protection is made up of part of a membrane seal that is sealed to cover the product contained in the container.

4. The container according to claim 1, wherein the container includes a cavity in which a cosmetic product cartridge is mounted to refill the container with product.

5. The container according to claim 4, wherein the data medium is secured to the cosmetic product cartridge.

6. The container according to claim 4, wherein the container and the cartridge include angular indexing positioning the data medium relative to the antenna of the electronic data processing device.

7. The container according to claim 1, wherein the electronic data processing device is supplied with electric current by a power supply formed by at least one battery.

8. The container according to claim 1, wherein the electronic data processing device occupies an active state and a passive state in which said device is stopped or in standby mode in order to reduce the electricity consumption.

9. The container according to claim 1, wherein the electronic data processing device exchanges data with at least one electronic apparatus including a software application delivering items of information via at least one display screen, including at least one item of information related to the PAO.

10. A cosmetic product cartridge having a given period after opening (PAO) for refilling a container, said container including at least one electronic data processing device able to:
    read data associated with said cosmetic product and contained in a data medium; and,
    selectively record at least a first opening of the product so as to be able to calculate the PAO of said product,
    wherein the cartridge includes said data medium and removable protection arranged to form a screen prohibiting reading of the data medium until said protection is eliminated once the product has been opened initially.

11. The cartridge according to claim 10, wherein the data medium is an RFID tag.

12. The cartridge according to claim 10, wherein the protection is made up of part of a membrane seal that is sealed to cover the product contained in the cartridge.

13. The cartridge according to claim 10, wherein the cartridge includes angular indexing cooperating with complementary means of the container to position said data medium relative to an antenna of the electronic data processing device.

* * * * *